(12) United States Patent
Chen

(10) Patent No.: US 7,228,788 B1
(45) Date of Patent: Jun. 12, 2007

(54) PISTON STRUCTURE FOR AN AIR PUMP

(76) Inventor: Chi-Ming Chen, 8F, No. 205, Sec. 3, Pei Hsin Rd., Hsintien City, Taipei Hsien (TW)

( * ) Notice: Subject to any disclaimer, the term of this patent is extended or adjusted under 35 U.S.C. 154(b) by 0 days.

(21) Appl. No.: 11/321,867

(22) Filed: Dec. 30, 2005

(51) Int. Cl.
*F01B 31/00* (2006.01)
*F16J 9/00* (2006.01)

(52) U.S. Cl. .......................... 92/181 P; 92/245; 92/255

(58) Field of Classification Search ................ 92/172, 92/181 R, 181 P, 240, 245, 255; 91/422; 417/545, 550
See application file for complete search history.

(56) References Cited

U.S. PATENT DOCUMENTS 3,961,868 A * 6/1976 Droege et al. ................ 92/240

\* cited by examiner

*Primary Examiner*—Michael Leslie
(74) *Attorney, Agent, or Firm*—Leong C. Lei

(57) ABSTRACT

A piston for an air pump is disclosed. The piston has a piston rod having a connecting axle hole for positioning a bearing, which is protected with a bearing protection cap. The bearing is firmly secured within the axle hole.

3 Claims, 5 Drawing Sheets

PISTON STRUCTURE FOR AN AIR PUMP

BACKGROUND OF THE INVENTION (a) Technical Field of the Invention

The present invention relates to piston, and in particular, to a piston mounted within a cylinder.

(b) Description of the Prior Art

Pistons used in conventional small size or portable pump employ TEFLON, a high temperature resistance, wear-resistance material as a material for rings of the pistons TEFLON is an extremely high plasticizing material and the rings are mounted or secured at the outer surface of the piston. The drawbacks of such structure are that, for example, stability of the structure is not sufficient, and air-sealing is poor, which causes non-smooth rotating, air leakage, air compression ratio being insufficient. Additionally, the longevity of the piston is affected.

Currently, another type of conventional piston, as shown in FIG. 1 has a recessed circular slot A2 at the external edge of the piston A1, and the recessed circular slot A2 is mounted with a circular gas ring A3. There is a seal between the ring A3 and the cylinder wall such that high speed reciprocation operation of the piston will achieve the objective of the air compression and air-filling. However, the drawbacks of this conventional structure are that (1) the binding force between the circular ring and the piston slot is weak and therefore, the circular ring is dislocated or biased;
(2) the tolerance and precision between the circular ring and the piston circular slot has to be accurate. Thus, the inaccurately of the tolerance will affect the stability of the reciprocation process;
(3) if the tolerance is too great motor may be affected and high heat and expansion will occur;
(4) if the tolerance is too small, the air compression is insufficient and air leakage will occur; and
(5) as shown in FIG. 1, if the bearing A4 is dislocated or biased, the air pump will be damaged and the longevity of the pump is affected.

SUMMARY OF THE INVENTION

The primary purpose of the present invention is to provide a piston for an air pump which mitigates the above-mentioned drawbacks.

Yet still another object of the present invention is to provide a piston for an air pump comprising a valve sealing plate, an upper piston plate, an air ring, a piston rod, locking component, a bearing and a bearing protection cap, characterized in that the valve sealing plate is flatly mounted by a pegging plate and a peg onto a venting hole provided on the upper piston plate; wherein the upper piston plate has a bottom with an external edge having a circular protruded edge, and the piston plate has a row of venting holes in combination with the valve sealing plate, and the bottom section of the upper piston plate is provided with screw nut for combination with a recess at the lower piston plate, and the locking component is used to lock the lower piston plate; the air ring is mounted between the upper and the lower piston plate and has a hollow bowl cavity and is made from temperature resistant and wear-resistant material, and the diameter of the air ring is larger than that of the inner wall of the cylinder, and the external edge is a converging face inwardly inclined; the piston rod is formed together with the lower piston plate and the axle hole at the bottom section of the lower piston plate; and the lower piston late and the upper piston plate are locked with the locking component, and the interior of the piston rod is a recessed positioning slot and the two ends of the positioning slot is a through hole; the external side of the recessed slot is provided with at least one inlet, and the lower section of the piston rod is an axle hole having a blocking edge at the inner side, and the external edge of the axle hole is locked and protected with a bearing protection cap to protect the bearing positioned within the axle hole; the bearing is positioned within the axle hole of the piston rod; and the bearing protection cap locks the external edge of the axle hole of the piston rod and the protruded edge of the protection cap urges the bearing within the axle hole.

Still a further object of the present invention is to provide a piston structure for an air pump, wherein the upper and the lower piston plates form into an interior to provide air convection.

Another further object of the present invention is to provide a piston structure for an air pump, wherein the external edge of the protruded edge of the bearing protection cap and the bearing form into an effective space for the application of a lubricant.

The foregoing object and summary provide only a brief introduction to the present invention. To fully appreciate these and other objects of the present invention as well as the invention itself, all of which will become apparent to those skilled in the at, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
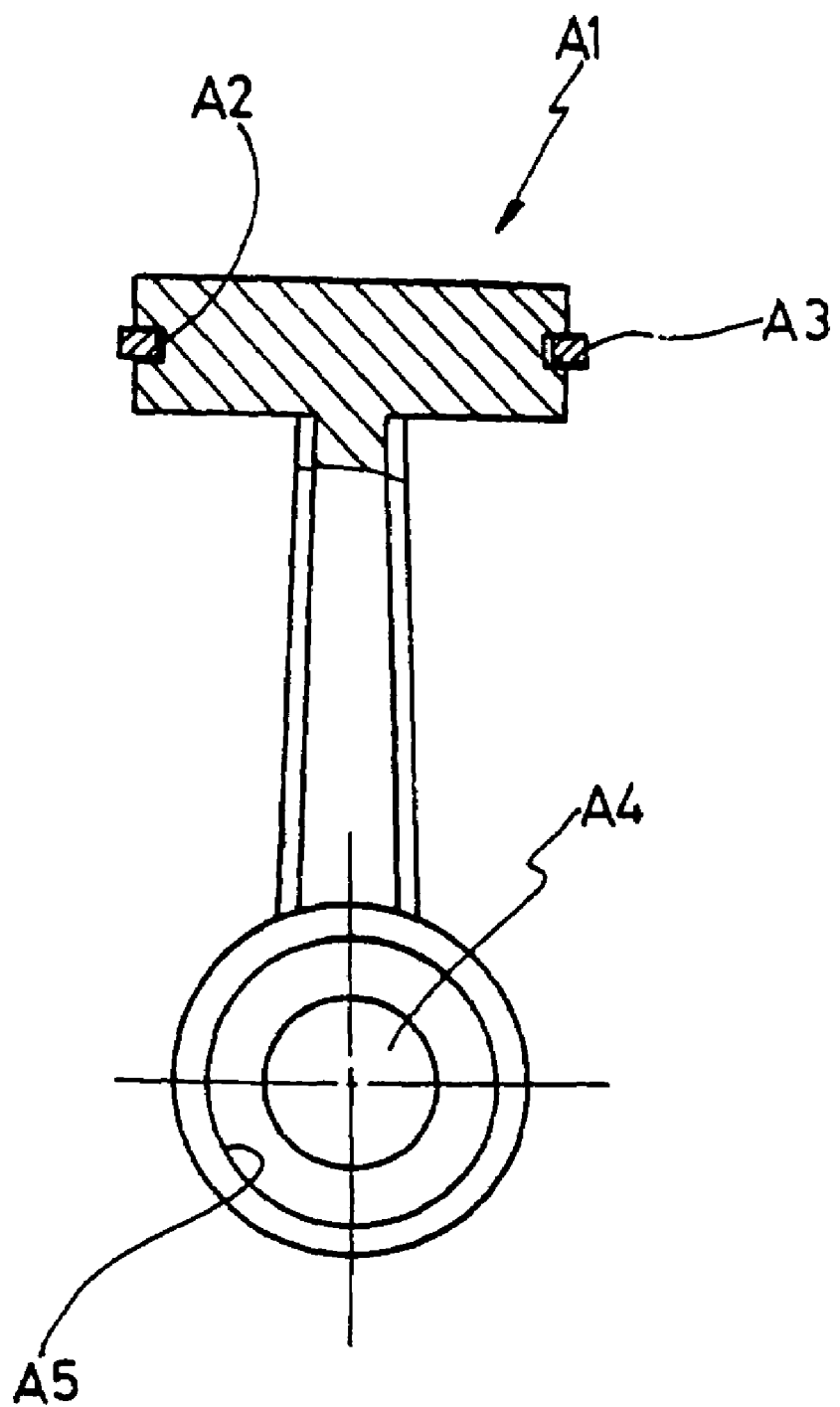
FIG. 1 is a sectional view of a conventional piston of the air-filing pump.
Figure 2:
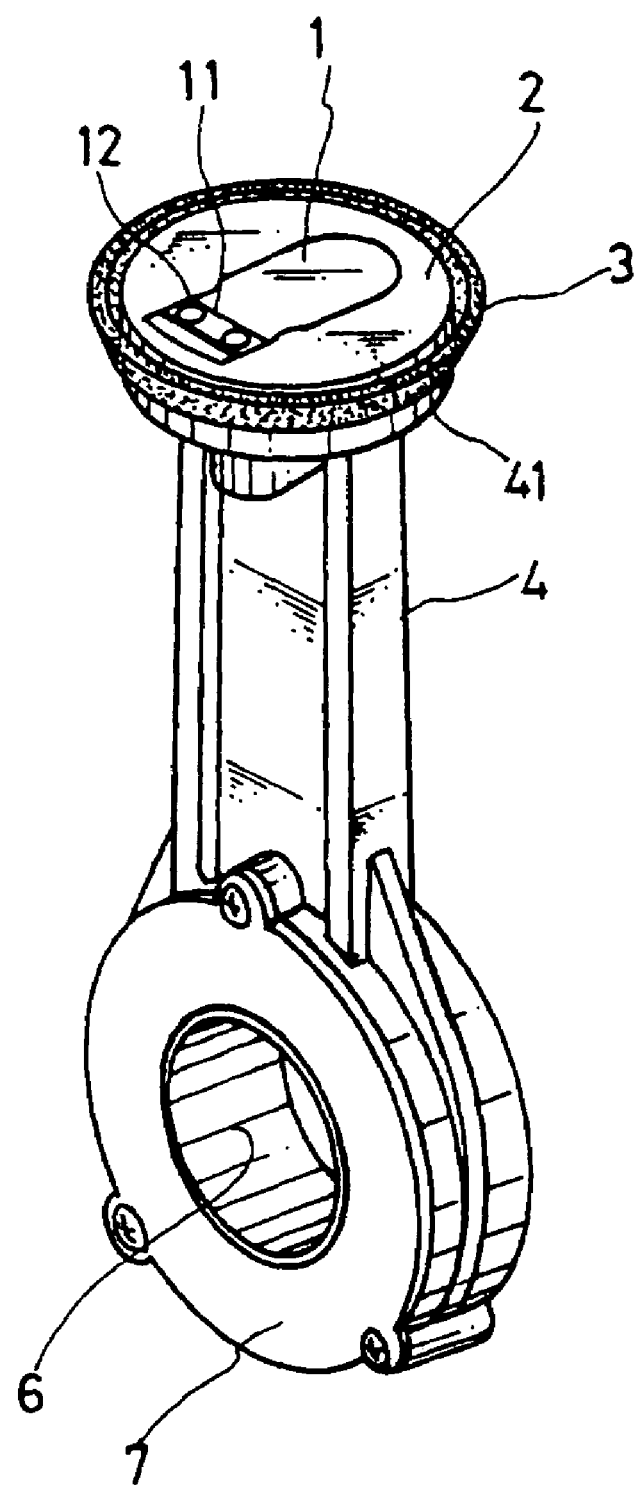
FIG. 2 is a perspective view of the piston of the present invention.
Figure 3:
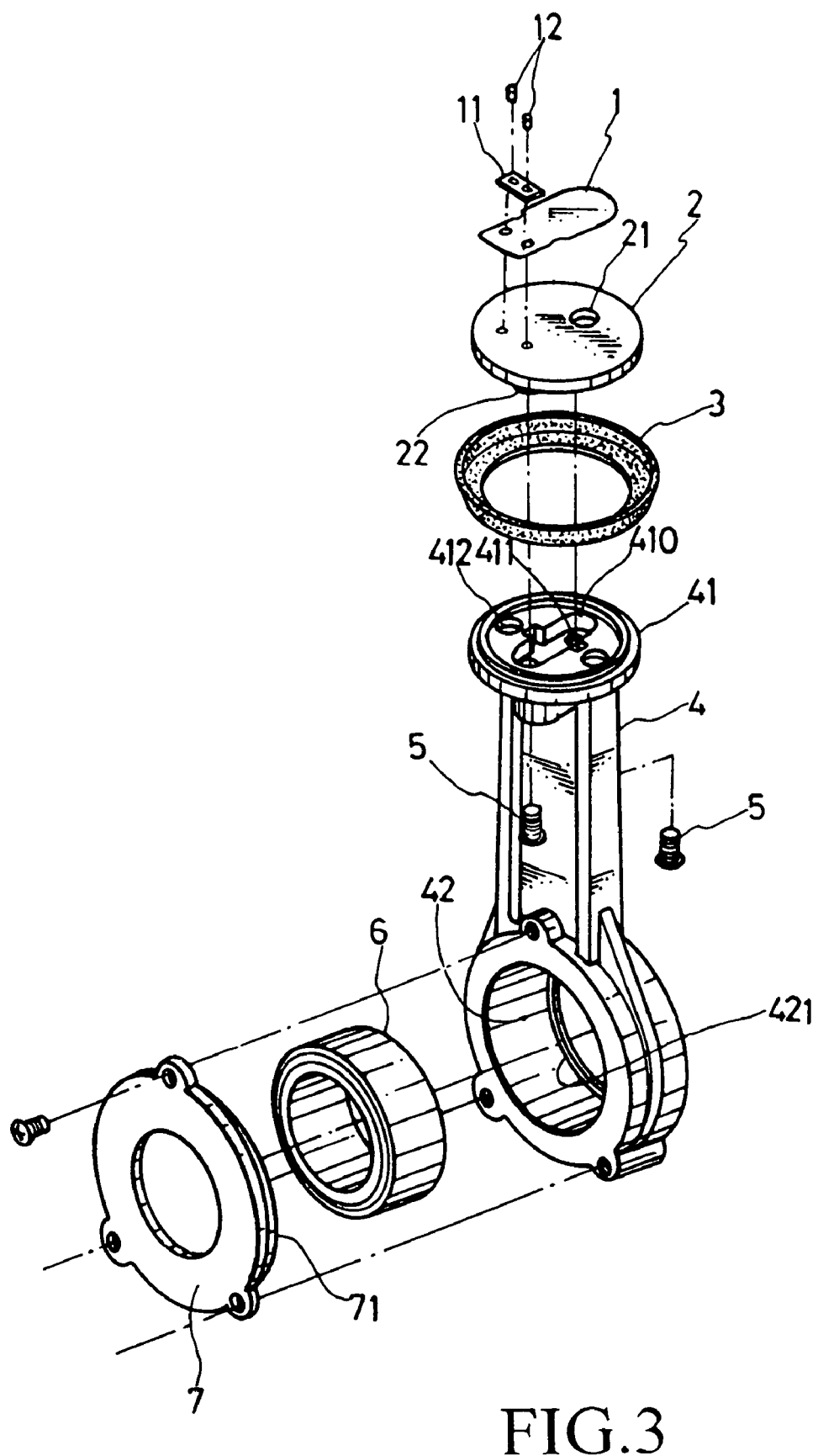
FIG. 3 is an exploded perspective view of the piston of the present invention.

Referring to FIGS. 2 and 3, there is shown a piston for an air pump of the present invention comprising a valve sealing plate 1, an upper piston plate 2, an air ring 3, a piston rod 4, locking component 5, a bearing 6 and a bearing protection cap 7. One side of the valve sealing plate 1 is provided with a pegging plate 11 and a peg 12 which can cover the valve sealing plate 1 onto the venting hole 21 on the upper piston plate 2, such that in the course of high speed reciprocation movement of the piston, the opening and closing of the sealing plate 1 cause venting and sealing. The present piston has an upper piston plate 2 and a lower piston plate 41. The upper piston plate 2 has a valve sealing plate 1 and the lower piston plate 41 is in combination with the axle hole 42 at the lower section of the piston rod 4. The air ring 3 is positioned between the upper piston plate 2 and the lower piston plate 41 and the locking component 5, passing through the through hole 411 at the bottom section of the lower piston plate 41 lock the lower piston plate 41 onto the positioning screw rod 22 of the upper piston plate 2 such that the air ring 3 is secured between the upper and the lower piston plates 2, 41, and the wall of the cylinder is elastically sealed with respect to reciprocation movement.

The inner edge of the air ring 3 is a hollow bowl shape which is made from high temperature resistant and wear resistant material, such as TEFLON, and the external diameter of the air ring 3 is slightly larger than the diameter of the cylinder, and the external edge is a converging face which is inwardly inclined. After it is combined with the internal wall of the cylinder, the internal wall of the cylinder is elastically sealed.

Figure 4:
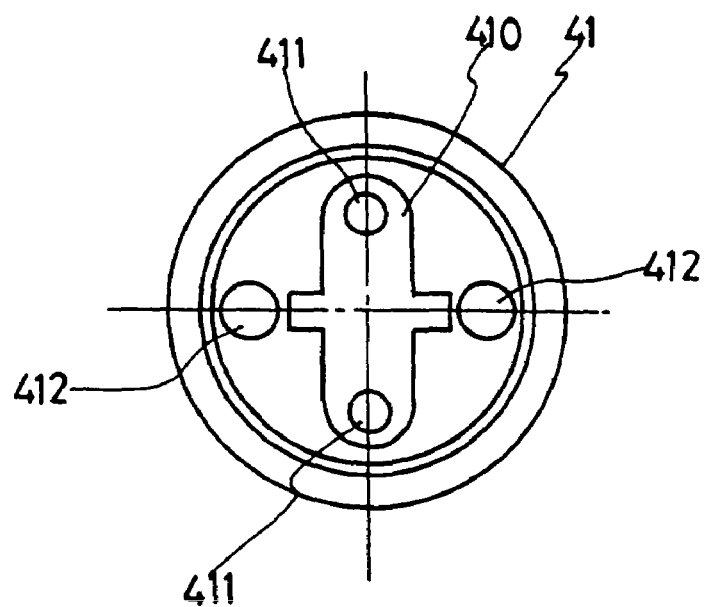
FIG. 4 is the top view of the lower piston plate of the present invention.
Figure 5:
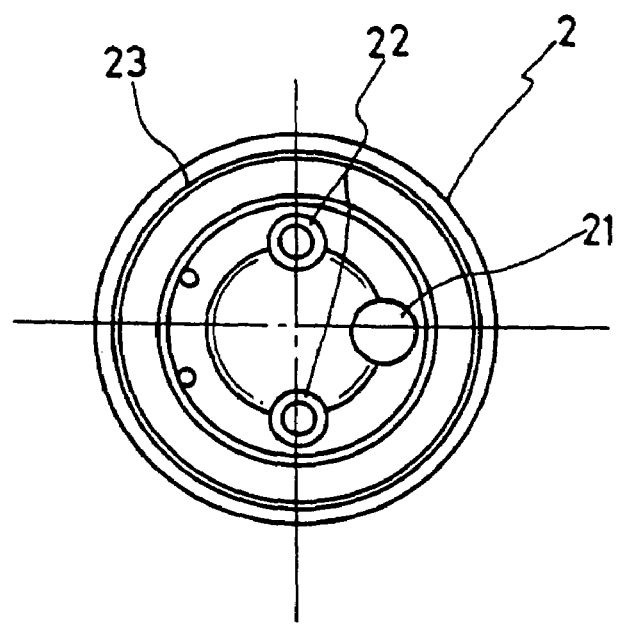
FIG. 5 is the top view of the bottom section of the upper piston plate of the present invention.

As shown in FIG. 4, there is shown a top view of the lower piston plate 41, and the interior of the lower piston plate 41 has a recessed slot 410 and a through hole 411 at the two ends thereof. The external side of the lower piston plate 41 has at least one inlet 412. As shown in FIG. 5, there is shown the top view at the bottom section of the upper piston plate 2. The external edge is a pressing protruded edge 23, and the bottom section is a protruded positioning screw rod 22 so that it will correspond to the recessed slot 410 and the through hole 411, and the locking component 5 is employed for locking the upper piston plate 2. The air ring 3 with the aid of the protruded edge is effectively secured.

Referring to FIG. 5, after the upper piston plate 2 and the lower piston plate 41 are locked at the air ring, the upward and downward reciprocation movement can synchronously withdraw air and expel air. The interiors of the upper and lower piston plate are formed into an effective air stream space 20. Thus, when the piston is reciprocating at a high speed, the upper stroke will cause the valve sealing plate 1 to seal and air is compressed out via the piston, and the down stroke of the piston will withdraw air via the inlet 412 of the piston 41. The air stream space 20 forms into a pressure which is effectively pushed open the valve sealing plate 1. The high speed reciprocation movement allows the valve sealing plate 1 to operate effectively and the amount of withdrawal air is increased relatively, which improves the flow rate of air and the compression ratio of the cylinder. Thus, the air-filling rate of the air pump is enhanced.

Figure 6:
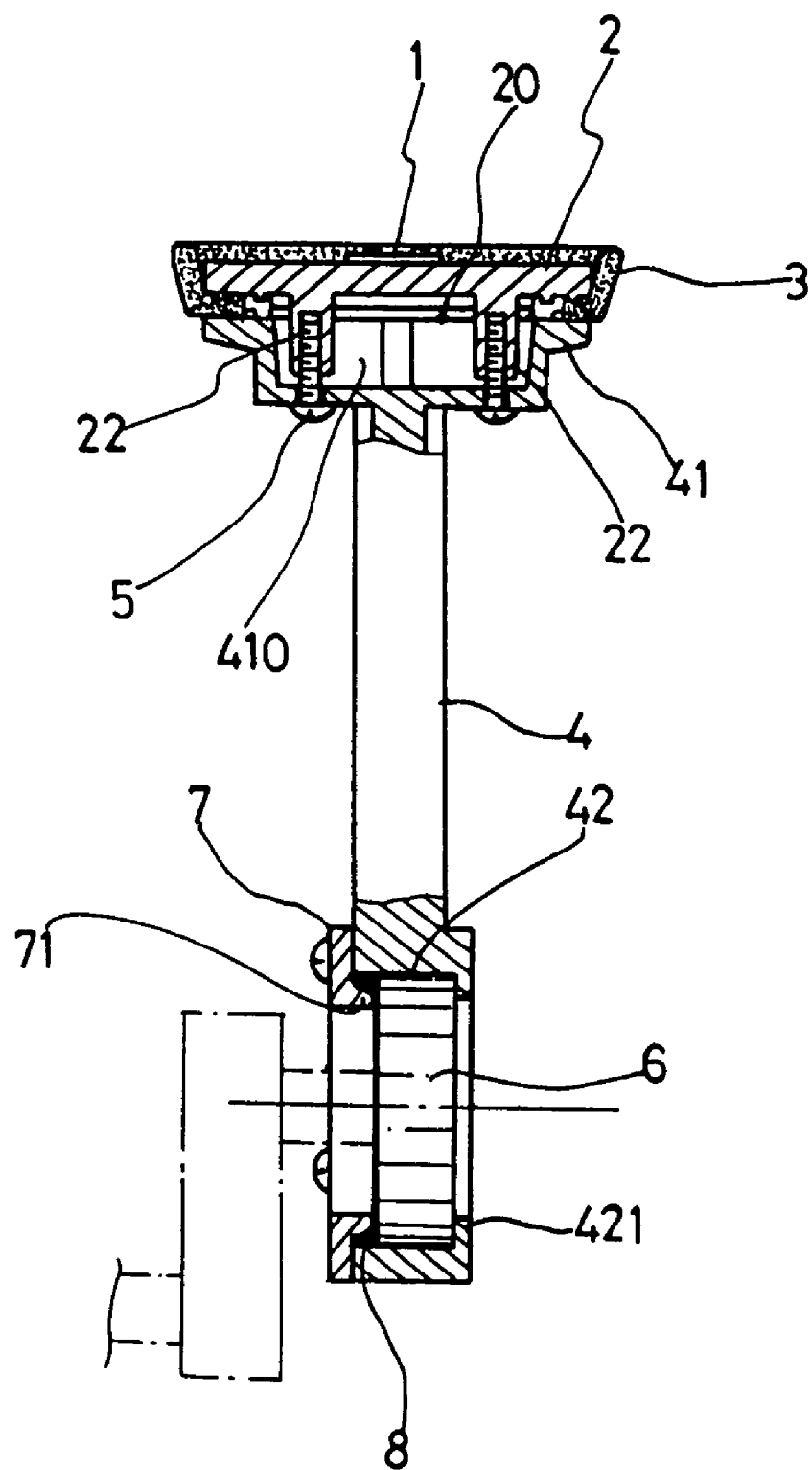
FIG. 6 is a sectional view of the piston within the cylinder in accordance with the present invention.

Referring FIG. 6, the lower section of the piston rod 4 has an axle hole 42 for holding the bearing 6. The inner side of the axle hole 42 is a blocking edge 42 which can be positioned the bearing 6. The external edge of the axle hole 42 is a bearing protection cap 7 which is locked by a locking component, and the protruded face 71 at the internal of the protection cap 7 can tightly urge the bearing 6 within the axle hole 42 such that the bearing 6 will be positioned within the axle hole 42. This will eliminate the dislocation of the bearing 6 at high reciprocation speed. At the same time, the effective gap formed between the external edge of the protruded edge 71 of the protection cap and the bearing is used for the application of a lubricant, which will lubricate the bearing and effectively improves high efficient operation.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A piston for an air pump comprising a valve sealing plate, an upper piston plate, an air ring, a piston rod, locking component, a bearing and a bearing protection cap, wherein the valve sealing plate is flatly mounted by a pegging plate and a peg onto a venting hole provided on the upper piston plate, the upper piston plate has a bottom with an external edge having a circular protruded edge, and the piston plate has a venting hole in combination with the valve sealing plate, and the bottom section of the upper piston plate is provided with a positioning screw rod for combination with a recess at a lower piston plate, and the locking component is used to lock the lower piston plate;

the air ring is mounted between the upper and the lower piston plate and has a hollow bowl cavity and is made from temperature resistant and wear-resistant material, and the diameter of the air ring is larger than that of the inner wall of the cylinder, and the external edge is a converging face inwardly inclined;

the piston rod is formed together with the lower piston plate and an axle hole at a lower section of the piston rod; and the lower piston late and the upper piston plate are locked with the locking component, and the lower piston plate has a recessed slot and through holes; the external side of the recessed slot is provided with at least one inlet, the axle hole having a blocking edge at the inner side, and the external edge of the axle hole is locked and protected with the bearing protection cap to protect the bearing positioned within the axle hole;

the bearing is positioned within the axle hole of the piston rod; and the bearing protection cap locks the external edge of the axle hole of the piston rod and a protruded edge of the protection cap urges the bearing within the axle hole.

2. The piston of claim 1, wherein the upper and the lower piston plates form into an interior to provide air convection.

3. The piston of claim 1, wherein the external edge of the protruded edge of the bearing protection cap and the bearing form into an effective space for the application of a lubricant.

* * * * *